(12) United States Patent
Ko et al.

(10) Patent No.: US 12,530,749 B2
(45) Date of Patent: Jan. 20, 2026

(54) KNOWLEDGE DISTILLATION-BASED SYSTEM FOR LEARNING OF TEACHER MODEL AND STUDENT MODEL

(71) Applicant: KOREA UNIVERSITY RESEARCH AND BUSINESS FOUNDATION, Seoul (KR)

(72) Inventors: Sung Jea Ko, Seoul (KR); Sung Jin Cho, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 295 days.

(21) Appl. No.: 18/355,226

(22) Filed: Jul. 19, 2023

(65) Prior Publication Data

US 2024/0119571 A1 Apr. 11, 2024

(30) Foreign Application Priority Data

Sep. 27, 2022 (KR) .................. 10-2022-0122752

(51) Int. Cl.
*G06T 5/73* (2024.01)
*G06T 5/20* (2006.01)
(Continued)

(52) U.S. Cl.
CPC .................. *G06T 5/73* (2024.01); *G06T 5/20* (2013.01); *G06V 10/25* (2022.01); *G06V 10/44* (2022.01);
(Continued)

(58) Field of Classification Search
CPC ... G06T 5/73; G06T 5/20; G06T 2207/20016; G06T 7/20; G06T 2207/20084; G06V 10/25; G06V 10/44; G06V 10/764; G06V 10/30; G06V 10/82; G06V 2201/07; G06N 3/096; G06N 3/045; G06N 3/0464
See application file for complete search history.

(56) References Cited

U.S. PATENT DOCUMENTS 10,593,020 B2 * 3/2020 Gu ............................ G06N 3/08
11,900,260 B2 * 2/2024 Sridhar .................... G06N 3/08
(Continued)

FOREIGN PATENT DOCUMENTS

| KR | 10-2282730 B1 | 7/2021 |
| KR | 10-2336103 B1 | 12/2021 |
| KR | 10-2022-0069201 A | 5/2022 |

OTHER PUBLICATIONS

Everingham et al. "The PASCAL Visual Object Classes (VOC) Challenge" *International journal of computer vision* vol. 88. 2010 (pp. 303-338).

(Continued)

*Primary Examiner* — John B Strege
(74) *Attorney, Agent, or Firm* — NSIP Law

(57) ABSTRACT

Disclosed is a system for improving the detection performance of objects of interest in blurry images. According to an embodiment of the disclosed system for improving the detection performance of objects of interest in blurry images, the system includes a teacher network including a first base subnet, a first feature pyramid subnet and a first detection subnet; and a student network including a second base subnet, a second feature pyramid subnet, a deblurring subnet and a second detection subnet, wherein the teacher network provides hints to the student network.

20 Claims, 6 Drawing Sheets

(51) Int. Cl.
  *G06V 10/25* (2022.01)
  *G06V 10/44* (2022.01)
  *G06V 10/764* (2022.01)
(52) U.S. Cl.
  CPC .. *G06V 10/764* (2022.01); *G06T 2207/20016* (2013.01); *G06V 2201/07* (2022.01)

(56) References Cited

U.S. PATENT DOCUMENTS

| | | | | |
|---|---|---|---|---|
| 2019/0244331 | A1* | 8/2019 | Gu | G06T 5/50 |
| 2021/0350506 | A1 | 11/2021 | Chang | |
| 2022/0398766 | A1* | 12/2022 | Ishii | G06F 18/217 |
| 2023/0196520 | A1* | 6/2023 | Lee | G06N 3/02 |
| | | | | 382/255 |
| 2023/0298142 | A1* | 9/2023 | Lin | G06T 5/50 |
| | | | | 382/255 |
| 2023/0316536 | A1* | 10/2023 | Lee | G06T 3/02 |
| 2024/0169498 | A1* | 5/2024 | Shi | H04N 23/6812 |

OTHER PUBLICATIONS

Lin et al. "Microsoft COCO: Common Objects in Context" *Computer Vision—ECCV 2014: 13th European Conference*, Zurich, Switzerland, Sep. 6-12, 2014, *Proceedings, Part V 13*. Springer International Publishing, Feb. 21, 2015 (pp. 1-15).

Korean Office Action issued on Sep. 18, 2025, in corresponding Korean Patent Application No. 10-2022-0122752. (4 pages in English, 4 pages in Korean).

Zhang, Linfeng, and Kaisheng Ma. "Improve object detection with feature-based knowledge distillation: Towards accurate and efficient detectors." International conference on learning representations. 2020., Published as a conference paper at ICLR 2021. (Jan. 13, 2021). (pp. 1-14).

* cited by examiner

KNOWLEDGE DISTILLATION-BASED SYSTEM FOR LEARNING OF TEACHER MODEL AND STUDENT MODEL

CROSS-REFERENCE TO RELATED APPLICATION

This application claims priority to Korean Patent Application No. 10-2022-0122752, filed on Sep. 27, 2022, and all the benefits accruing therefrom under 35 U.S.C. § 119, the contents of which in its entirety are herein incorporated by reference.

BACKGROUND

1. Field

The present disclosure relates to a knowledge distillation-based system for learning of a teacher model and a student model, and more particularly, to a system for improving the detection performance of objects of interest in blurry images by training a student network using knowledge acquired from a teacher network based on knowledge distillation.

2. Description of the Related Art

Object detection is the technique that identifies locations and types of objects of interest present in a single image as input. Recently, as the size of autonomous vehicle market is growing and the security and surveillance industry is expanding, there is a rising need for advanced object detection techniques for improved performance.

The key of the object detection technique is to identify the locations and categories of objects of interest in images fast and accurately. Most of the object detection techniques are performed in images acquired from commercially available cameras, and the acquired images may be blurry due to camera shake or rapid object motion. The blur in the acquired images may cause visual discomfort and degrade the performance of the entire detection system.

The common datasets for object detection of PACAL VOC (Non-Patent Literature 1) and COCO (Non-Patent Literature 2) do not adequately consider noise and motion blur in images. Accordingly, the above literatures may fail to detect objects when blurry images or images that are less clear due to motion blur are applied as inputs.

Meanwhile, knowledge distillation is one of network compression methods for improving the speed by effectively compressing models in order to actually apply trained artificial neural networks to services. The knowledge distillation method trains a student network using knowledge acquired from a teacher network. The student network emulates the pre-trained teacher network, thereby improving the performance of the learning model with a smaller number of parameters. Additionally, it is known that the trained student network shows better performance than when it is trained alone.

The knowledge distillation method may train the network having low computational complexity and memory usage, called the student network using the network having relatively higher performance, called the teacher network. In this instance, the knowledge distillation method defines a loss function that compares a feature map of the teacher network with a feature map of the student network, and trains the student network using the same.

RELATED LITERATURES

Non-Patent Literature (Non-Patent Literature 0001) M. Everingham, L. Van Gool, C. K. I. Williams, J. Winn, and W. Zisserman, "The PASCAL visual object classes (VOC) challenge," Int. J. Comput. Vis., vol. 88, no. 2, September 2010.

(Non-Patent Literature 0002) T.-Y. Lin, M. Maire, S. Belongie, J. Hays, P. Perona, D. Ramanan, P. Dollár, and C. L. Zitnick, "Microsoft COCO: Common objects in context," in Proc. Eur. Conf. Comput. Vis., 2014.

SUMMARY

To solve the above-described problem, the present disclosure is directed to providing a system for improving the detection performance of objects of interest in blurry images by training a student network using knowledge acquired from a teacher network based on knowledge distillation.

To achieve the above-described objective, a system according to an embodiment of the present disclosure includes a teacher network including a first base subnet, a first feature pyramid subnet and a first detection subnet; and a student network including a second base subnet, a second feature pyramid subnet, a deblurring subnet and a second detection subnet, wherein the teacher network provides hints to the student network.

Here, the deblurring subnet may include a 1×1 convolution kernel and a 3×3 deformable convolution kernel, the 3×3 deformable convolution kernel may include a 3×3 convolution kernel and an offset field, and the offset field may be estimated through the 3×3 convolution kernel.

Here, the first base subnet and the first feature pyramid subnet may perform a process expressed as the following Equation 1, and the second base subnet and the second feature pyramid subnet may perform a process expressed as the following Equation 2:

$$F_n \triangleq \{f_n^l\}_{l=1}^L = \varepsilon(x_n) \quad \text{(Equation 1)}$$

$$\tilde{F}_n \triangleq \{\tilde{f}_n^l\}_{l=1}^L = \varepsilon(\tilde{x}_n) \quad \text{(Equation 2)}$$

where $F_n$ denotes a first parameter derived through the Equation 1, $\tilde{F}_n$ denotes a second parameter derived through the Equation 2, $$\{f_n^l\}_{l=1}^L$$

denotes an l-th feature extracted from the first feature pyramid subnet, $$\{\tilde{f}_n^l\}_{l=1}^L$$

denotes an l-th feature extracted from the second feature pyramid subnet, $\varepsilon(\cdot)$ denotes a combined function of the base subnet and the feature pyramid subnet, $x_n$ denotes an n-th sharp image, and $\tilde{x}_n$ denotes an n-th blurry image.

Here, the first detection subnet may perform a process expressed as the following Equation 3, and the second detection subnet may perform a process expressed as the following Equation 4:

$$Z_n \triangleq \{(z_n^k, b_n^k)\}_{k=1}^K = \mathcal{D}(F_n) \quad \text{(Equation 3)}$$

$$\tilde{Z}_n \triangleq \{(\tilde{z}_n^k, \tilde{b}_n^k)\}_{k=1}^K = \mathcal{D}(\mathcal{H}(\tilde{F}_n))$$ (Equation 4)

where $Z_n$ denotes a third parameter derived through the Equation 3, $\tilde{Z}_n$ denotes a fourth parameter derived through the Equation 4, $$z_n^k$$

denotes a k-th classification logit before applying a softmax function in the teacher network, $$\tilde{z}_n^k$$

denotes a k-th classification logit before applying the softmax function in the student network, $$b_n^k$$

denotes an object bounding box measured in the n-th sharp image, $$\tilde{b}_n^k$$

denotes an object bounding box measured in the n-th blurry image, $\mathcal{D}(\cdot)$ denotes a function for deriving the first and second detection subnets, and $\mathcal{H}(\cdot)$ denotes a function for deriving the deblurring subnet.

Here, a total loss function of the system may be expressed as Equation 5:

$$L_{total}=L_{det}+\lambda_1 L_{SG}+\lambda_2 L_{deblur}$$ (Equation 5)

where $L_{total}$ denotes the total loss function, $L_{det}$ denotes a loss function of the first detection subnet and the second detection subnet, $L_{SG}$ denotes a parameter which controls smoothness of probability distribution, $L_{deblur}$ denote a loss function of the deblurring subnet, and each of $\lambda_1$ and $\lambda_2$ is 0.5.

Here, the $L_{deblur}$ may perform a process expressed as the following Equation 6:

$$L_{deblur} = \sum_{n=1}^{N}\sum_{l=1}^{L}\left\|\tilde{f}_n^l - f_n^l\right\|_1$$ (Equation 6)

where M denotes $$\sum_{n=1}^{N}\sum_{k=1}^{K} w_n^k, f_n^l$$

denotes an object bounding box measured in the n-th sharp image, $$\tilde{f}_n^l$$

denotes an object bounding box measured in the n-th blurry image, and $\|\cdot\|_1$ denotes "1-norm".

Here, the $L_{SG}$ may be expressed as the following Equation 7:

$$L_{SG}=L_{conf}+L_{reg}$$ (Equation 7)

where $L_{SG}$ denotes a total loss function of self-guided learning, $L_{conf}$ denotes an objective function for transferring classification knowledge from sharp features to blurry features, and $L_{reg}$ denotes a regression loss function of self-guided learning.

The student network may be supervised by soft labels from the teacher network, wherein the soft labels may be calculated by a process of the following Equation 8:

$$p_{n,c}^k = \frac{\exp(z_{n,c}^k/\tau)}{\sum_{c=1}^{C}\exp(z_{n,c}^k/\tau)}$$ (Equation 8)

where $$p_n^k$$

denotes a soft estimation obtained from the n-th sharp image, $$z_n^k$$

denotes a k-th classification logit before applying a softmax function in the teacher network, and $\tau$ denotes a parameter which controls smoothness of probability distribution.

Here, the $L_{conf}$ may be expressed as the following Equation 9:

$$L_{conf} = -\frac{1}{M}\sum_{n=1}^{N}\sum_{k=1}^{K}(w_n^k + v_n^k)CE(\tilde{p}_n^k, p_n^k)$$ (Equation 9)

where M denotes $$\sum_{n=1}^{N}\sum_{k=1}^{K} w_n^k, \tilde{p}_n^k$$

denotes a soft estimation obtained from the n-th blurry image, and $CE(\cdot, \cdot)$ denotes a cross-entropy loss function.

Here, the $L_{reg}$ may be expressed as the following Equation 10:

$$L_{reg} = \frac{1}{M}\sum_{n=1}^{N}\sum_{k=1}^{K}w_n^k\left\|\tilde{b}_n^k - b_n^k\right\|_1 \quad \text{(Equation 10)}$$

where M denotes $$\sum_{n=1}^{N}\sum_{k=1}^{K}w_n^k, b_n^k$$

denotes an object bounding box measured in the n-th sharp image, $$\tilde{b}_n^k$$

denotes an object bounding box measured in the n-th blurry image, and $\|\cdot\|_1$ denotes "1-norm".

The knowledge distillation-based system for learning of a teacher model and a student model according to the present disclosure may improve the detection performance of objects of interest in blurry images by training the student network using knowledge acquired from the teacher network based on knowledge distillation.

However, the effect that may be achieved by the knowledge distillation-based system for learning of a teacher model and a student model according to embodiments of the present disclosure is not limited to the above-mentioned effects, and these and other effects will be clearly understood by those skilled in the art from the following description.

BRIEF DESCRIPTION OF THE DRAWINGS

The accompanying drawings included as a part of the detailed description to help understanding of the present disclosure provide embodiments of the present disclosure, and describe the technical spirit of the present disclosure together with the detailed description.

DETAILED DESCRIPTION

Figure 1:
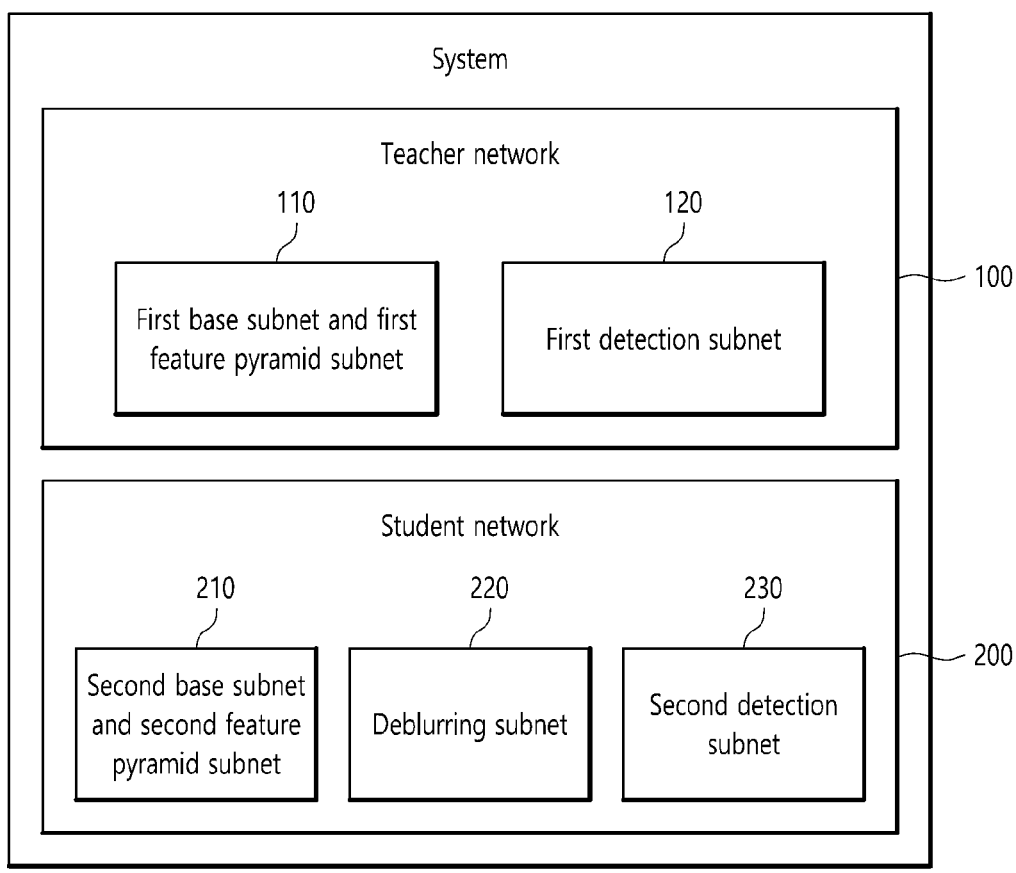
FIG. 1 is a block diagram of a knowledge distillation-based system for learning of a teacher model and a student model according to the present disclosure.

The present disclosure may have a variety of modifications and include many embodiments, and particular embodiments are shown in the drawings and described in detail. However, it is not intended to limit the present disclosure to the particular embodiments, and it should be understood as including all modifications, equivalents or substitutes within the spirit and scope of the present disclosure.

The terms "first", "second" and the like may be used to describe various elements, but the elements should not be limited by the terms. These terms are used to distinguish one element from another. For example, a first element may be referred to as a second element, and likewise, a second element may be referred to as a first element without departing from the scope of protection of the present disclosure. The term "and/or" includes a combination of items related to the plural form or any of the items.

It will be understood that when an element is referred to as being "connected to" or "coupled to" another element, it can be directly connected or coupled to the other element, but intervening elements may be present between them. In contrast, it will be understood that when an element is referred to as being "directly connected to" or "directly coupled to" another element, there are no intervening elements between them.

The terminology used herein is for the purpose of describing particular embodiments and is not intended to be limiting of the present disclosure. As used herein, the singular forms include the plural forms as well, unless the context clearly indicates otherwise. It will be further understood that the term "comprises" or "includes" when used in this specification, specifies the presence of stated features, integers, steps, operations, elements, components or a combination thereof, but does not preclude the presence or addition of one or more other features, integers, steps, operations, elements, components or a combination thereof.

Unless otherwise defined, all terms including technical and scientific terms used herein have the same meaning as commonly understood by those skilled in the art. The terms, such as those defined in commonly used dictionaries, should be interpreted as having a meaning that is consistent with their meaning in the context of the relevant art, and will not be interpreted in an idealized or overly formal sense unless expressly so defined herein.

Hereinafter, the exemplary embodiments of the present disclosure will be described in more detail with reference to the accompanying drawings. In describing the present disclosure, like reference signs are used for like elements in the drawings to ease the understanding of the present disclosure and redundant descriptions of like elements are omitted.

FIG. 1 is a block diagram of a knowledge distillation-based system for learning of a teacher model and a student model according to the present disclosure.

Referring to FIG. 1, the knowledge distillation-based system 1000 for learning of a teacher model and a student model according to the present disclosure may include a teacher network 100 and a student network 200. The teacher network 100 may include a first base subnet and first feature pyramid subnet 110 and a first detection subnet 120. The student network 200 may include a second base subnet and second feature pyramid subnet 210, a deblurring subnet 220 and a second detection subnet 230.

Figure 2:
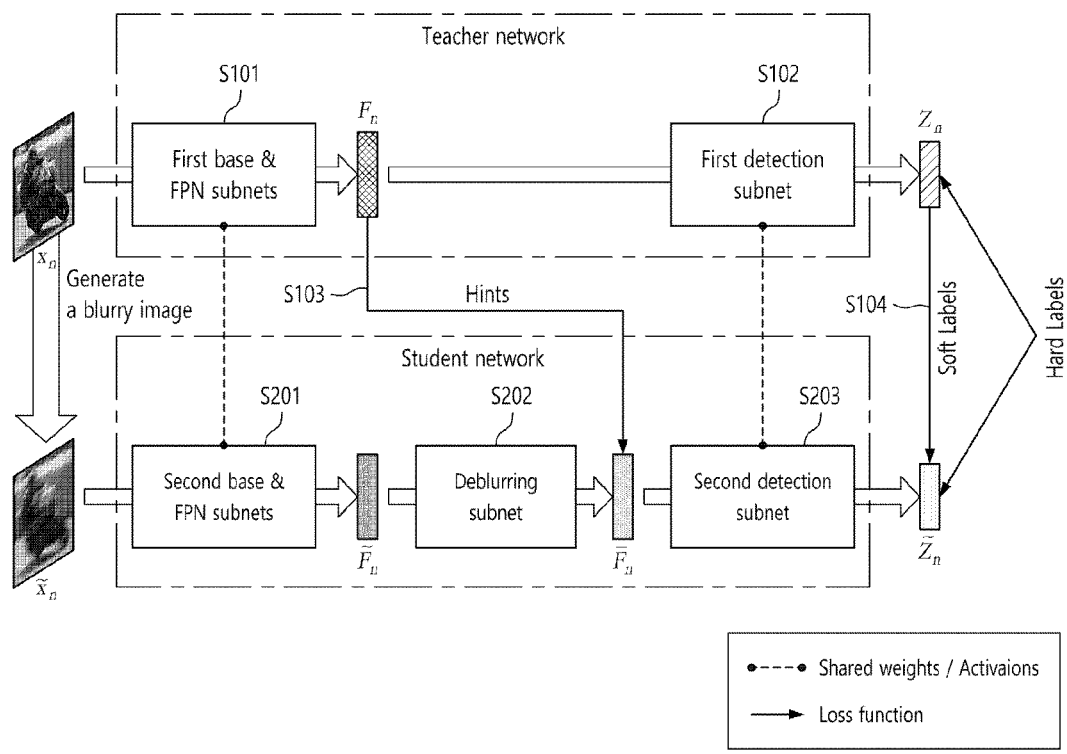
FIG. 2 shows a structure of a deblurring subnet according to the present disclosure.

FIG. 2 shows a structure of the deblurring subnet 220 according to the present disclosure.

Referring to FIG. 2, the deblurring subnet 220 may include a 1×1 convolution kernel and a 3×3 deformable convolution kernel to reduce the computational complexity of the deformable convolution at a reduction ratio of r=4.

The 3×3 deformable convolution kernel may include a 3×3 convolution kernel and an offset field. The 3×3 deformable convolution kernel may deform the kernel shape based on the 3×3 convolution kernel and the offset field, and extract features using the deformed kernels.

From a channel-reduced feature map, the offset field may be estimated through the 3×3 convolution kernel for the sampling operation of adaptive convolution. The offset field has the same spatial dimension as the channel-reduced feature map and each pixel may include horizontal and vertical offsets of the 3×3 convolution kernel.

Figure 3:
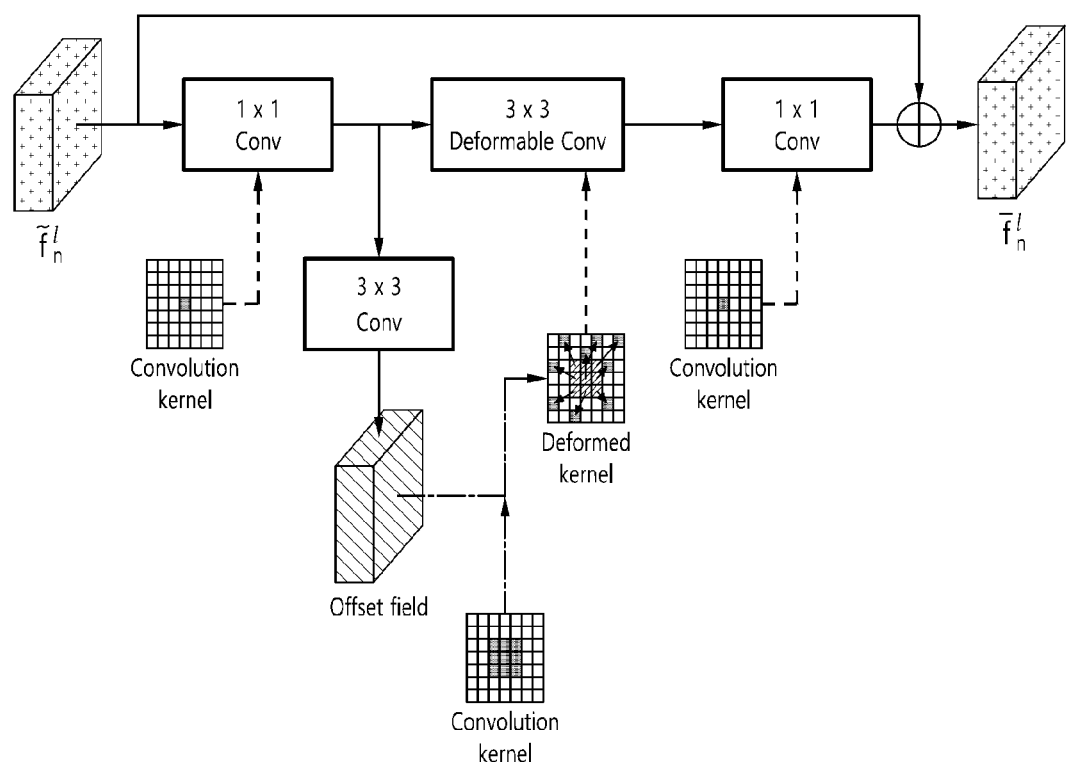
FIG. 3 is a conceptual diagram of a knowledge distillation-based system for learning of a teacher model and a student model according to the present disclosure.

FIG. 3 is a conceptual diagram of the knowledge distillation-based system for learning of a teacher model and a student model according to the present disclosure.

Referring to FIG. 3, sharp images may be inputted to the first base subnet and first feature pyramid subnet 110 of the teacher network 100, and the first base subnet and first feature pyramid subnet 110 may perform a process (S101) of the following Equation 2.

$$F_n \triangleq \{f_n^l\}_{l=1}^L = \varepsilon(x_n) \quad \text{(Equation 1)}$$

where $F_n$ denotes a first parameter derived through the above Equation 1, $$\{f_n^l\}_{l=1}^L$$

denotes an l-th feature extracted from the first feature pyramid subnet, $\varepsilon(\cdot)$ denotes a combined function of the base subnet and the feature pyramid subnet, and $x_n$ denotes an n-th sharp image.

The first parameter calculated through the step S101 may be inputted to the first detection subnet 120, and the first detection subnet 120 may perform a process (S102) of the following Equation 3.

$$Z_n \triangleq \{(z_n^k, b_n^k)\}_{k=1}^K = \mathcal{D}(F_n) \quad \text{(Equation 3)}$$

where $Z_n$ denotes a third parameter derived through the above Equation3, $$z_n^k$$

denotes a k-th classification logit before applying the softmax function in the teacher network, $$b_n^k$$

denotes an object bounding box measured in the n-th sharp image, and $\mathcal{D}(\cdot)$ denotes a function for deriving the first and second detection subnets.

Blurry images may be inputted to the second base subnet and second feature pyramid subnet 210 of the student network 200, and the second base subnet and second feature pyramid subnet 210 may perform a process (S201) of the following Equation 2.

$$\tilde{F}_n \triangleq \{\tilde{f}_n^l\}_{l=1}^L = \varepsilon(\tilde{x}_n) \quad \text{(Equation 2)}$$

where $\tilde{F}_n$ denotes a second parameter derived through the above Equation 2, $$\{\tilde{f}_n^l\}_{l=1}^L$$

denotes an l-th feature extracted from the second feature pyramid subnet, $\varepsilon(\cdot)$ denotes a combined function of the base subnet and the feature pyramid subnet, and $\tilde{x}_n$ denotes an n-th blurry image.

The second parameter calculated through the above step S201 may be inputted to the deblurring subnet 220, and a loss function in a process (S202) performed by the deblurring subnet 220 may be expressed as the following Equation 6.

$$L_{deblur} = \sum_{n=1}^N \sum_{l=1}^L \left\| \overline{f}_n^l - f_n^l \right\|_1 \quad \text{(Equation 6)}$$

where $L_{deblur}$ denotes the loss function of the deblurring subnet, M denotes $$\sum_{n=1}^N \sum_{k=1}^K w_n^k, f_n^l$$

denotes an object bounding box measured in the n-th sharp image, $$\overline{f}_n^l$$

denotes an object bounding box measured in the n-th blurry image, and $\|\cdot\|_1$ denotes "1-norm".

The teacher network 100 may provide hints to the student network 200. $\overline{F}_n$ may be derived through the process (S202) performed by the deblurring subnet 220 and the hints provided by the teacher network 100. The $\overline{F}_n$ may be inputted to the second detection subnet 230, and the second detection subnet 230 may perform a process (S203) of the following Equation 4.

$$\tilde{Z}_n \triangleq \{(\tilde{z}_n^k, \tilde{b}_n^k)\}_{k=1}^K = \mathcal{D}(\mathcal{H}(\tilde{F}_n)) \quad \text{(Equation 4)}$$

where $\tilde{Z}_n$ denotes a fourth parameter derived through the above Equation 4, $$\tilde{z}_n^k$$

denotes a k-th classification logit before applying the softmax function in the student network, $$\tilde{b}_n^k$$

denotes an object bounding box measured in the n-th blurry image, $\mathcal{D}(\cdot)$ denotes the function for deriving the first and second detection subnets, $\mathcal{H}(\cdot)$ denotes a function for deriving the deblurring subnet, and $\overline{F}_n$ denotes the second parameter derived through the above Equation 2.

The total loss function of the system 1000 may be expressed as the following Equation 5.

$$L_{total} = L_{det} + \lambda_1 L_{SG} + \lambda_2 L_{deblur} \quad \text{(Equation 5)}$$

where $L_{total}$ denotes the total loss function, $L_{det}$ denotes the loss function of the first detection subnet and the second detection subnet, $L_{SG}$ denotes the total loss function of self-guided learning, $L_{deblur}$ denotes the loss function of the deblurring subnet, and $\lambda_1$ and $\lambda_2$ denote variables that control the smoothness of probability distribution and each is 0.5.

The total loss function of self-guided learning may be expressed as the following Equation 7.

$$L_{SG}=L_{conf}+L_{reg} \quad \text{(Equation 7)}$$

where $L_{SG}$ denotes the total loss function of self-guided learning, $L_{conf}$ denotes an objective function for transferring classification knowledge from sharp features to blurry features, and $L_{reg}$ denotes the regression loss function of self-guided learning.

The student network 200 may be supervised by soft labels and/or hard labels from the teacher network 100. The soft labels may be calculated by a process of the following Equation 8.

$$p_{n,c}^k = \frac{\exp(z_{n,c}^k/\tau)}{\sum_{c=1}^{C}\exp(z_{n,c}^k/\tau)} \quad \text{(Equation 8)}$$

where $$p_n^k$$

denotes a soft estimation obtained from the n-th sharp image, $$z_n^k$$

denotes the k-th classification logit before applying the softmax function in the teacher network, $\tau$ and denotes a parameter that controls the smoothness of probability distribution.

The $L_{conf}$ may be expressed as the following Equation 9.

$$L_{conf} = -\frac{1}{M}\sum_{n=1}^{N}\sum_{k=1}^{K}(w_n^k + v_n^k)CE(\tilde{p}_n^k, p_n^k) \quad \text{(Equation 9)}$$

where M denotes $$\sum_{n=1}^{N}\sum_{k=1}^{K}w_n^k, \tilde{p}_n^k$$

denotes a soft estimation obtained from the n-th blurry image, and CE(•, •) denotes a cross-entropy loss function.

The $L_{reg}$ may be expressed as the following Equation 10.

$$L_{reg} = \frac{1}{M}\sum_{n=1}^{N}\sum_{k=1}^{K}w_n^k\left\|\tilde{b}_n^k - b_n^k\right\|_1 \quad \text{(Equation 10)}$$

where M denotes $$\sum_{n=1}^{N}\sum_{k=1}^{K}w_n^k, b_n^k$$

denotes the object bounding box measured in the n-th sharp image, $$\tilde{b}_n^k$$

denotes the object bounding box measured in the n-th blurry image, and $\|\cdot\|_1$ denotes "1-norm". Hereinafter, the knowledge distillation-based system for learning of a teacher model and a student model according to the present disclosure will be described in detail with reference to the drawings.

Figure 4A:
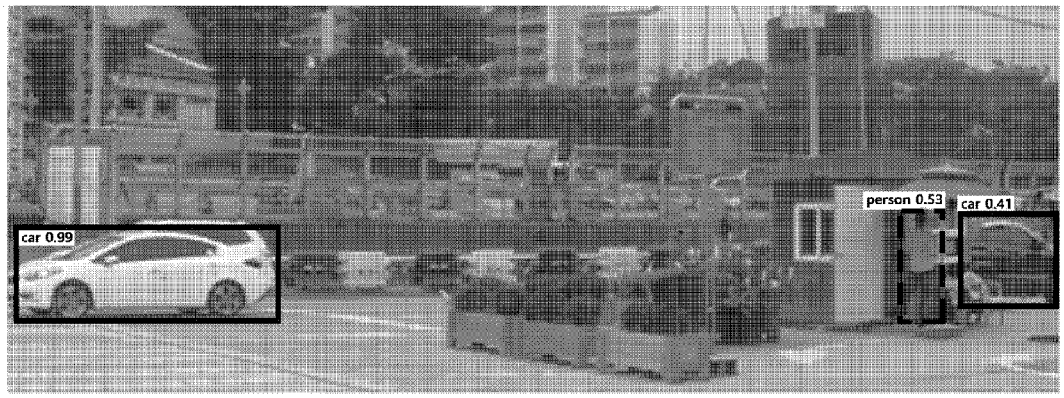
FIGS. 4A to 4D show a first embodiment of a knowledge distillation-based system for learning of a teacher model and a student model according to the present disclosure.
Figure 4B:
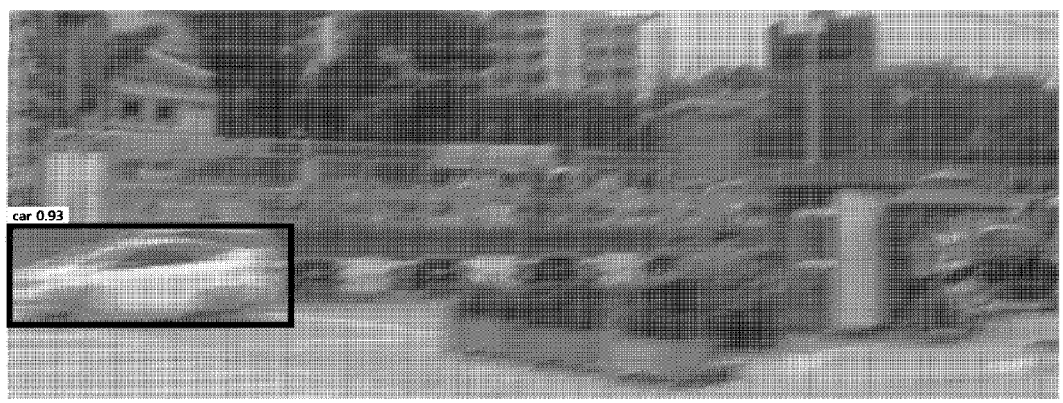
Figure 4C:
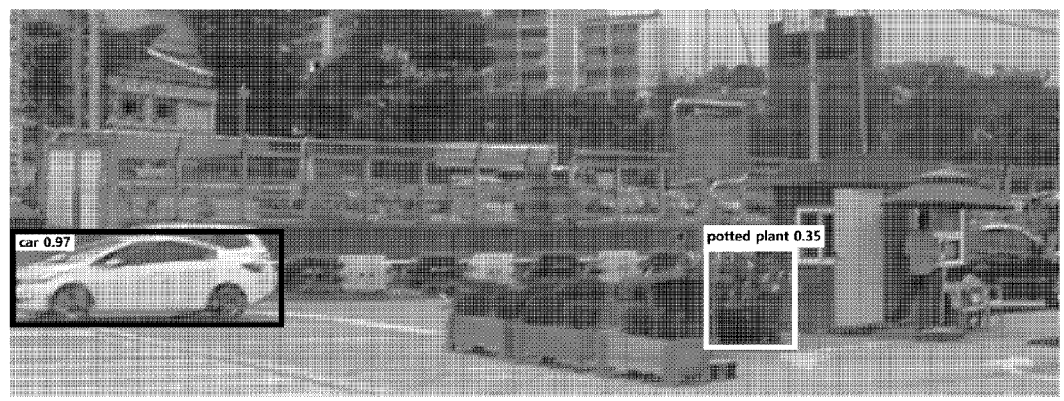
Figure 4D:
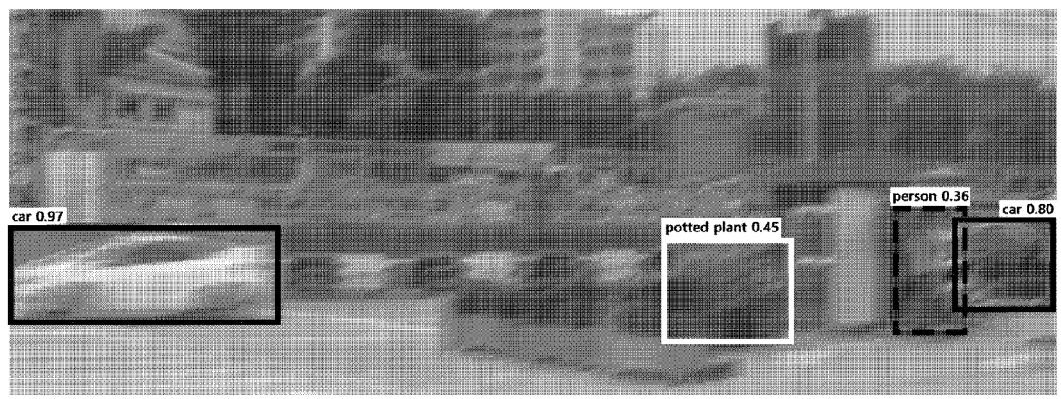

FIGS. 4A to 4D show a first embodiment of the knowledge distillation-based system for learning of a teacher model and a student model according to the present disclosure. FIG. 4A is an image showing the detection performance of the object detection technique when sharp images are applied as inputs. FIG. 4B is an image showing the detection performance of the object detection technique when blurry images are applied as inputs. FIG. 4C is an image showing the detection performance of the object detection technique when blurry images are deblurred and applied as inputs. FIG. 4D is an image showing the detection performance of the object detection technique when blurry images are applied as inputs to the knowledge distillation system according to an embodiment of the present disclosure.

Referring to FIG. 4A, it can be seen that a human and a vehicle are accurately detected when sharp images are applied as inputs. Referring to FIG. 4B, it can be seen that a human and a vehicle are not accurately detected when blurry images are applied as inputs. Referring to FIG. 4C, it can be seen that a human and a vehicle are not detected or not accurately detected when blurry images are deblurred and applied as inputs. That is, it can be seen that the method that deblurs blurry images and applying as inputs is difficult to deblur a plurality of images and degrades the detection performance of the object detection technique. Referring to FIG. 4D, it can be seen that the object detection technique trained using the system according to an embodiment of the present disclosure accurately detects a human and a vehicle.

Figure 5:
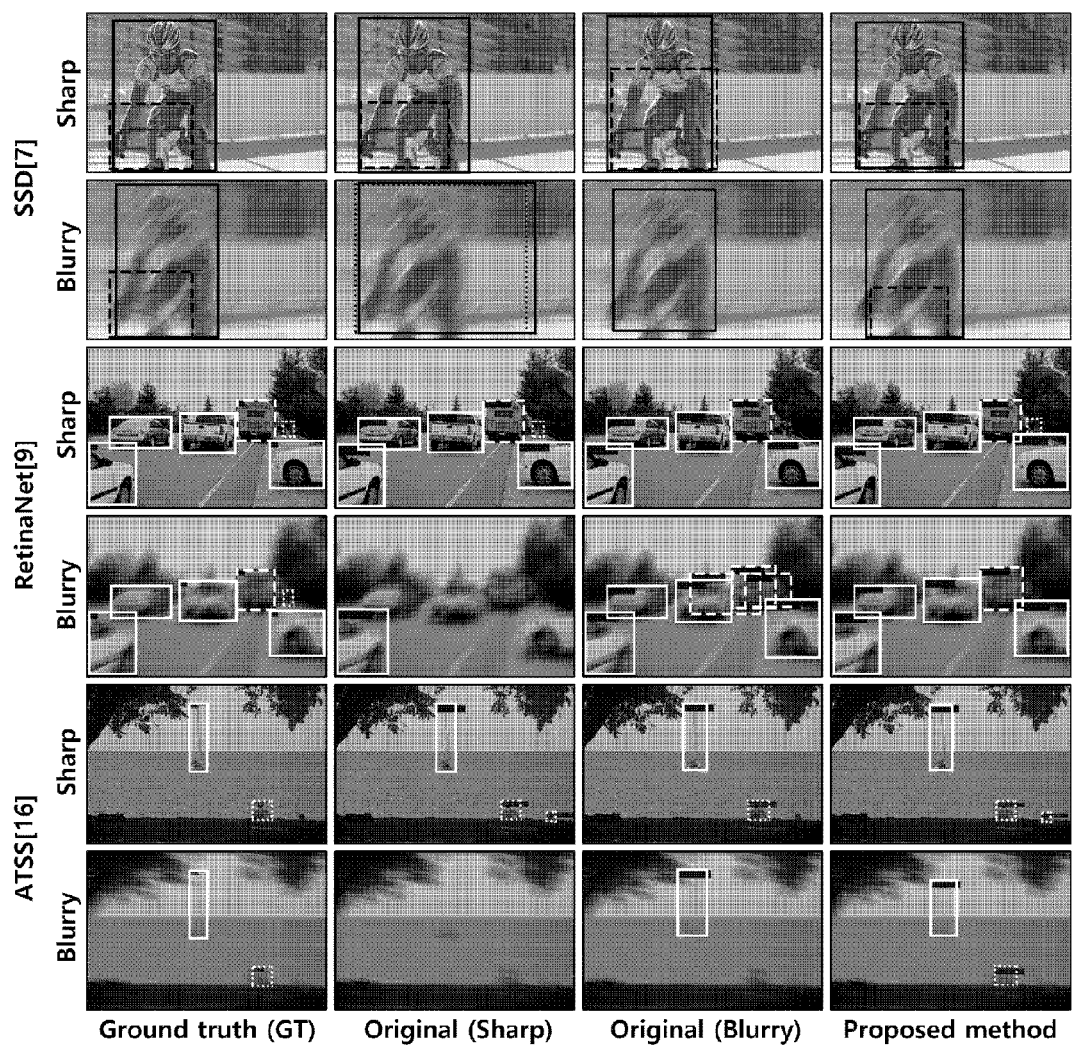
FIG. 5 shows a second embodiment of a knowledge distillation-based system for learning of a teacher model and a student model according to the present disclosure.

FIG. 5 shows a second embodiment of the knowledge distillation-based system for learning of a teacher model and a student model according to the present disclosure.

In FIG. 5, Ground truth (GT) is a true and accurate image displaying an object. Original (Sharp) is an image showing whether an object has been detected or not using an object detector trained with only sharp images. Original (Blurry) is an image showing whether an object has been detected or not using an object detector trained with only blurry images. The proposed method is the knowledge distillation-based system for learning of a teacher model and a student model according to an embodiment of the present disclosure. For the object detector, well-known Single Shot MultiBox Detector (SSD), Focal Loss for Dense Object Detection (RetinaNet) and Adaptive Training Sample Selection (ATSS) were used. For the training dataset, PASCAL VOC test 2007 dataset was used.

Referring to FIG. 5, SSD trained with only sharp images fails to accurately detect the range of objects in blurry images. SSD trained with only blurry images fails to detect some objects in blurry images. However, SSD trained using the system according to an embodiment of the present disclosure may accurately detect objects in blurry images.

RetinaNet trained with only sharp images fails to detect most of blurry images. Specifically, RetinaNet trained with only sharp images detected only one of six objects including vehicles and humans in blurry images. RetinaNet trained with only blurry images detected non-objects. However, RetinaNet trained using the system according to an embodiment of the present disclosure can detect objects in blurry images relatively accurately.

ATTS trained with only sharp images failed to detect objects in blurry images. ATTS trained with only blurry images failed to detect small objects in blurry images. However, ATTS trained using the system according to an embodiment of the present disclosure can accurately detect objects in blurry images.

The following Table 1 shows the comparison of object detection performance in sharp and blurry images according to the training method, training dataset and object detector. In Table 1, the rows contain the datasets, $VOC_{sharp}$ denotes sharp PASCAL VOC test 2007 dataset, and $VOC_{blurry}$ denotes blurry PASCAL VOC test 2007 dataset. In Table 1, the values indicate mean Average Precision (mAP), and the unit is %.

TABLE 1

| Training methods | Training data | SSD | | RetinaNet | | ATSS | |
| --- | --- | --- | --- | --- | --- | --- | --- |
| | | $VOC_{sharp}$ | $VOC_{blurry}$ | $VOC_{sharp}$ | $VOC_{blurry}$ | $VOC_{sharp}$ | $VOC_{blurry}$ |
| Original | $VOC_{sharp}$ | 77.33 | 34.2 | 79.9 | 34.0 | 79.1 | 31.2 |
| | $VOC_{blurry}$ | 73.4 | 66.5 | 71.2 | 62.1 | 67.0 | 58.0 |
| Proposed | $VOC_{pair}$ | 78.0 | 69.0 | 79.9 | 67.1 | 77.0 | 64.2 |

Referring to the above Table 1, it can be seen that the object detector trained using the proposed system has the outstanding object detection performance in blurry images. When ATSS is an object detector, it can be seen that the performance is slightly higher when trained with only sharp images than when trained using the proposed system. However, ATSS trained with only blurry images yields 31.2, while ATSS trained using the proposed system yields 64.2, and thus it can be seen that the object detection performance in blurry images is much higher.

Figure 6:
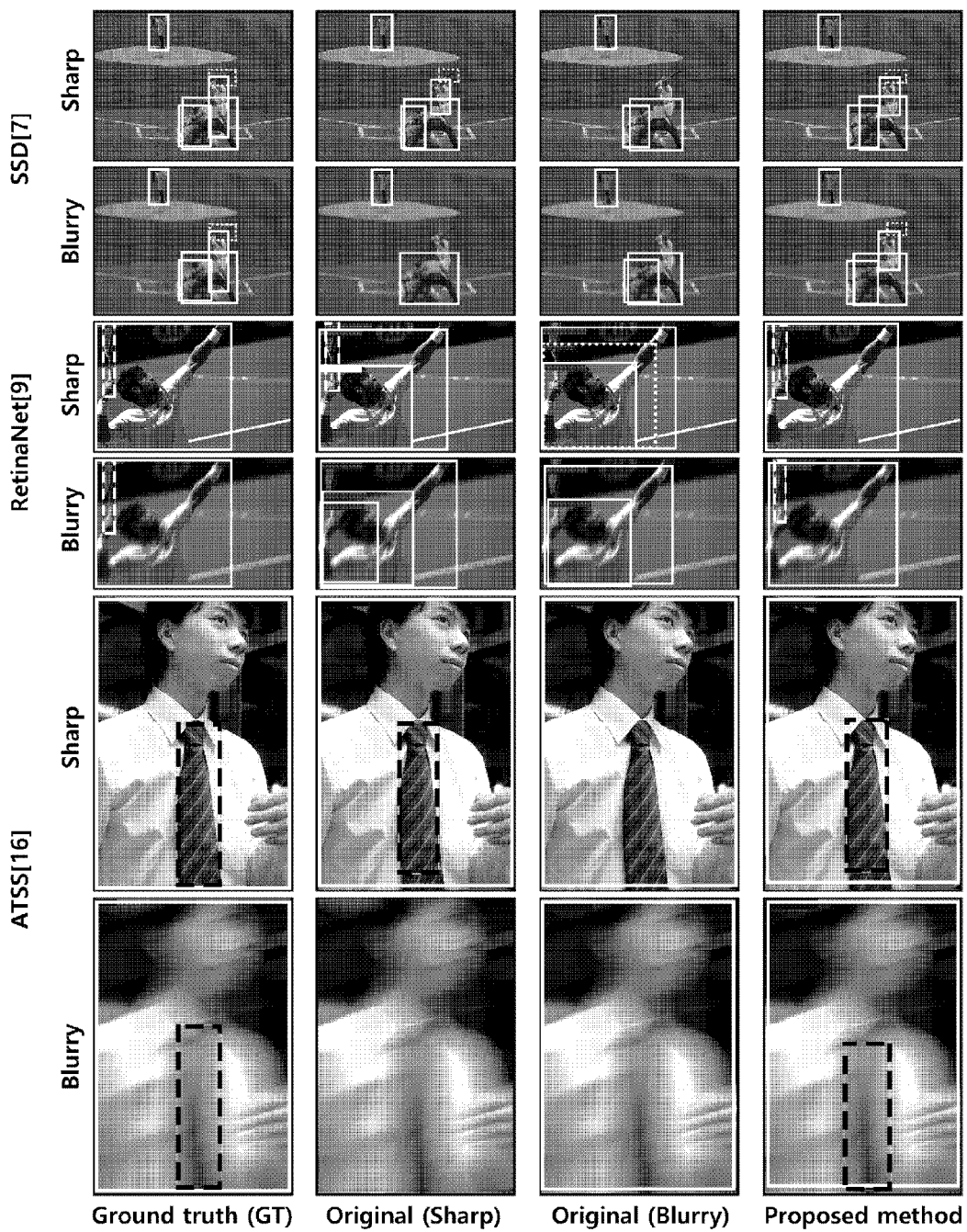
FIG. 6 shows a third embodiment of a knowledge distillation-based system for learning of a teacher model and a student model according to the present disclosure.

FIG. 6 shows a third embodiment of the knowledge distillation-based system for learning of a teacher model and a student model according to the present disclosure. In FIG. 6, for the training dataset, COCO val2017 dataset was used. The other conditions of the experiment were the same as the second embodiment.

Referring to FIG. 6, SSD trained with only sharp images fails to accurately detect the range of objects in blurry images. SSD trained with only blurry images fails to detect some objects in blurry images. However, SSD trained using the system according to an embodiment of the present disclosure can accurately detect objects in blurry images.

RetinaNet trained with only sharp images or only blurry images detects non-objects. However, RetinaNet trained using the system according to an embodiment of the present disclosure can accurately detect objects in blurry images.

ATTS trained with only sharp images or only blurry images failed to detect objects in blurry images. However, ATTS trained using the system according to an embodiment of the present disclosure can accurately detect objects in blurry images.

The following Table 2 shows the comparison of object detection performance in sharp and blurry images according to the training method, training dataset and object detector. In Table 1, $COCO_{sharp}$ denotes sharp COCOval2017 dataset, and $COCO_{blurry}$ denotes blurry COCOval2017 dataset.

TABLE 2

| Training methods | Training data | SSD | | RetinaNet | | ATSS | |
| --- | --- | --- | --- | --- | --- | --- | --- |
| | | $COCO_{sharp}$ | $COCO_{blurry}$ | $COCO_{sharp}$ | $COCO_{blurry}$ | $COCO_{sharp}$ | $COCO_{blurry}$ |
| Original | $COCO_{sharp}$ | 25.5 | 11.7 | 35.4 | 14.6 | 39.4 | 15.1 |
| | $COCO_{blurry}$ | 21.4 | 18.0 | 29.2 | 23.3 | 30.7 | 24.2 |
| Proposed | $COCO_{pair}$ | 26.9 | 21.5 | 36.4 | 27.1 | 36.5 | 27.3 |

Referring to the above Table 2, it can be seen that the object detector trained using the proposed system has the outstanding object detection performance in blurry images. When ATSS is an object detector, it can be seen that the performance is slightly higher when ATSS is trained with only sharp images than when trained using the proposed system. However, ATSS trained with only sharp images yields 15.1, while ATSS trained using the proposed system yields 27.3, and thus it can be seen that the object detection performance in blurry images is much higher.

Although the present disclosure has been hereinabove described with reference to the exemplary embodiments, those skilled in the art will understand that a variety of modifications and changes may be made to the present disclosure without departing from the spirit and scope of protection of the present disclosure described in the appended claims.

DETAILED DESCRIPTION OF MAIN ELEMENTS

1000: System
100: Teacher network
110: First base subnet and first feature pyramid subnet
120: First detection subnet
200: Student network
210: Second base subnet and second feature pyramid subnet
220: Deblurring subnet
230: Second detection subnet

What is claimed is:

1. A system, comprising:
a teacher network including a first base subnet, a first feature pyramid subnet and a first detection subnet; and
a student network including a second base subnet, a second feature pyramid subnet, a deblurring subnet and a second detection subnet,
wherein the teacher network provides hints to the student network, and
wherein the deblurring subnet includes:
a 1×1 convolution kernel; and
a 3×3 deformable convolution kernel,
wherein the 3×3 deformable convolution kernel includes a 3×3 convolution kernel and an offset field, and
wherein the offset field is estimated through the 3×3 convolution kernel.

2. The system according to claim 1, wherein the first base subnet and the first feature pyramid subnet perform a process expressed as the following Equation 1, and
wherein the second base subnet and the second feature pyramid subnet perform a process expressed as the following Equation 2:

$$F_n \triangleq \{f_n^l\}_{l=1}^L = \varepsilon(x_n) \quad \text{(Equation 1)}$$

$$\tilde{F}_n \triangleq \{\tilde{f}_n^l\}_{l=1}^L = \varepsilon(\tilde{x}_n) \quad \text{(Equation 2)}$$

where $F_n$ denotes a first parameter derived through the Equation 1, $\tilde{F}_n$ denotes a second parameter derived through the Equation 2, $$\{f_n^l\}_{l=1}^L$$

denotes an l-th feature extracted from the first feature pyramid subnet, $$\{\tilde{f}_n^l\}_{l=1}^L$$

denotes an l-th feature extracted from the second feature pyramid subnet, $\varepsilon(\bullet)$ denotes a combined function of the base subnet and the feature pyramid subnet, $x_n$ denotes an n-th sharp image, and $\tilde{x}_n$ denotes an n-th blurry image.

3. The system according to claim 2, wherein the first detection subnet performs a process expressed as the following Equation 3, and
wherein the second detection subnet performs a process expressed as the following Equation 4:

$$Z_n \triangleq \{(z_n^k, b_n^k)\}_{k=1}^K = \mathcal{D}(F_n) \quad \text{(Equation 3)}$$

$$\tilde{Z}_n \triangleq \{(\tilde{z}_n^k, \tilde{b}_n^k)\}_{k=1}^K = \mathcal{D}(\mathcal{H}(\tilde{F}_n)) \quad \text{(Equation 4)}$$

where $Z_n$ denotes a third parameter derived through the Equation 3, $\tilde{Z}_n$ denotes a fourth parameter derived through the Equation 4, $$z_n^k$$

denotes a k-th classification logit before applying a softmax function in the teacher network, $$\tilde{z}_n^k$$

denotes a k-th classification logit before applying the softmax function in the student network, $$b_n^k$$

denotes an object bounding box measured in the n-th sharp image, $$\tilde{b}_n^k$$

denotes an object bounding box measured in the n-th blurry image, $\mathcal{D}(\bullet)$ denotes a function for deriving the first and second detection subnets, and $\mathcal{H}(\bullet)$ denotes a function for deriving the deblurring subnet.

4. The system according to claim 1, wherein a total loss function of the system is expressed as Equation 5:

$$L_{total} = L_{det} + \lambda_1 L_{SG} + \lambda_2 L_{deblur} \quad \text{(Equation 5)}$$

where $L_{total}$ denotes the total loss function, $L_{det}$ denotes a loss function of the first detection subnet and the second detection subnet, $L_{SG}$ denotes a parameter which controls smoothness of probability distribution, $L_{deblur}$ denote a loss function of the deblurring subnet, and each of $\lambda_1$ and $\lambda_2$ is 0.5.

5. The system according to claim 4, wherein the $L_{deblur}$ performs a process expressed as the following Equation 6:

$$L_{deblur} = \sum_{n=1}^{N}\sum_{l=1}^{L}\left\|\tilde{f}_n^l - f_n^l\right\|_1 \quad \text{(Equation 6)}$$

where M denotes $$\sum_{n=1}^{N}\sum_{k=1}^{K} w_n^k, f_n^l$$

denotes an object bounding box measured in the n-th sharp image, $$\tilde{f}_n^l$$

denotes an object bounding box measured in the n-th blurry image, and $\|\bullet\|_l$ denotes "1-norm".

6. The system according to claim 4, wherein the $L_{SG}$ is expressed as the following Equation 7:

$$L_{SG} = L_{conf} + L_{reg} \quad \text{(Equation 7)}$$

where $L_{SG}$ denotes a total loss function of self-guided learning, $L_{conf}$ denotes an objective function for transferring classification knowledge from sharp features to blurry features, and $L_{reg}$ denotes a regression loss function of self-guided learning.

7. The system according to claim 6, wherein the student network is supervised by soft labels from the teacher network, and wherein the soft labels are calculated by a process of the following Equation 8:

$$p_{n,c}^k = \frac{\exp(z_{n,c}^k/\tau)}{\sum_{c=1}^{C}\exp(z_{n,c}^k/\tau)} \quad \text{(Equation 8)}$$

where $$p_n^k$$

denotes a soft estimation obtained from the n-th sharp image, $$z_n^k$$

denotes a k-th classification logit before applying a softmax function in the teacher network, and τ denotes a parameter which controls smoothness of probability distribution.

8. The system according to claim 7, wherein the $L_{conf}$ is expressed as the following Equation 9:

$$L_{conf} = -\frac{1}{M}\sum_{n=1}^{N}\sum_{k=1}^{K}(w_n^k + v_n^k)CE(\tilde{p}_n^k, p_n^k) \quad \text{(Equation 9)}$$

where M denotes $$\sum_{n=1}^{N}\sum_{k=1}^{K} w_n^k, \tilde{p}_n^k$$

denotes a soft estimation obtained from the n-th blurry image, and CE(•,•) denotes a cross-entropy loss function.

9. The system according to claim 6, wherein the $L_{reg}$ is expressed as the following Equation 10:

$$L_{reg} = \frac{1}{M}\sum_{n=1}^{N}\sum_{k=1}^{K} w_n^k \left\|\tilde{b}_n^k - b_n^k\right\|_1 \quad \text{(Equation 10)}$$

where M denotes $$\sum_{n=1}^{N}\sum_{k=1}^{K} w_n^k, b_n^k$$

denotes an object bounding box measured in the n-th sharp image, $$\tilde{b}_n^k$$

denotes an object bounding box measured in the n-th blurry image, and $\|\bullet\|_1$ denotes "1-norm".

10. A system, comprising:
a teacher network including a first base subnet, a first feature pyramid subnet and a first detection subnet; and
a student network including a second base subnet, a second feature pyramid subnet, a deblurring subnet and a second detection subnet,
wherein the teacher network provides hints to the student network,
wherein the first base subnet and the first feature pyramid subnet perform a process expressed as the following Equation 1, and
wherein the second base subnet and the second feature pyramid subnet perform a process expressed as the following Equation 2:

$$F_n \triangleq \{f_n^l\}_{l=1}^{L} = \mathcal{E}(x_n) \quad \text{(Equation 1)}$$

$$\tilde{F}_n \triangleq \{\tilde{f}_n^l\}_{l=1}^{L} = \mathcal{E}(\tilde{x}_n) \quad \text{(Equation 2)}$$

where $F_n$ denotes a first parameter derived through the Equation 1, $\tilde{F}_n$ denotes a second parameter derived through the Equation 2, $$\{f_n^l\}_{l=1}^{L}$$

denotes an l-th feature extracted from the first feature pyramid subnet, $$\{\tilde{f}_n^l\}_{l=1}^{L}$$

denotes an l-th feature extracted from the second feature pyramid subnet, ε(•) denotes a combined function of the base subnet and the feature pyramid subnet, $x_n$ denotes an n-th sharp image, and $\tilde{x}_n$ denotes an n-th blurry image.

11. The system according to claim 10, wherein the first detection subnet performs a process expressed as the following Equation 3, and
wherein the second detection subnet performs a process expressed as the following Equation 4:

$$Z_n \triangleq \{(z_n^k, b_n^k)\}_{k=1}^{K} = \mathcal{D}(F_n) \qquad \text{(Equation 3)}$$

$$\tilde{Z}_n \triangleq \{(\tilde{z}_n^k, \tilde{b}_n^k)\}_{k=1}^{K} = \mathcal{D}(\mathcal{H}(\tilde{F}_n)) \qquad \text{(Equation 4)}$$

where $Z_n$ denotes a third parameter derived through the Equation 3, $\tilde{Z}_n$ denotes a fourth parameter derived through the Equation 4, $$z_n^k$$

denotes a k-th classification logit before applying a softmax function in the teacher network, $$\tilde{z}_n^k$$

denotes a k-th classification logit before applying the softmax function in the student network, $$b_n^k$$

denotes an object bounding box measured in the n-th sharp image, $$\tilde{b}_n^k$$

denotes an object bounding box measured in the n-th blurry image, $\mathcal{D}(\bullet)$ denotes a function for deriving the first and second detection subnets, and $\mathcal{H}(\bullet)$ denotes a function for deriving the deblurring subnet.

12. The system according to claim 10, wherein a total loss function of the system is expressed as Equation 5:

$$L_{total}=L_{det}+\lambda_1 L_{SG}+\lambda_2 L_{deblur} \qquad \text{(Equation 5)}$$

where $L_{total}$ denotes the total loss function, $L_{det}$ denotes a loss function of the first detection subnet and the second detection subnet, $L_{SG}$ denotes a parameter which controls smoothness of probability distribution, $L_{deblur}$ denote a loss function of the deblurring subnet, and each of $\lambda_1$ and $\lambda_2$ is 0.5.

13. The system according to claim 12, wherein the $L_{deblur}$ performs a process expressed as the following Equation 6:

$$L_{deblur} = \sum_{n=1}^{N}\sum_{l=1}^{L}\left\| \tilde{f}_n^l - f_n^l \right\|_1 \qquad \text{(Equation 6)}$$

where M denotes $$\sum_{n=1}^{N} \sum_{k=1}^{K} w_n^k, f_n^l$$

denotes an object bounding box measured in the n-th sharp image, $$\tilde{f}_n^l$$

denotes an object bounding box measured in the n-th blurry image, and $\|\bullet\|_1$ denotes "1-norm".

14. The system according to claim 12, wherein the $L_{SG}$ is expressed as the following Equation 7:

$$L_{SG}=L_{conf}+L_{reg} \qquad \text{(Equation 7)}$$

where $L_{SG}$ denotes a total loss function of self-guided learning, $L_{conf}$ denotes an objective function for transferring classification knowledge from sharp features to blurry features, and $L_{reg}$ denotes a regression loss function of self-guided learning.

15. The system according to claim 14, wherein the student network is supervised by soft labels from the teacher network, and
wherein the soft labels are calculated by a process of the following Equation 8:

$$p_{n,c}^k = \frac{\exp(z_{n,c}^k/\tau)}{\sum_{c=1}^{C}\exp(z_{n,c}^k/\tau)} \qquad \text{(Equation 8)}$$

where $$p_n^k$$

denotes a soft estimation obtained from the n-th sharp image, $$z_n^k$$

denotes a k-th classification logit before applying a softmax function in the teacher network, and $\tau$ denotes a parameter which controls smoothness of probability distribution.

16. The system according to claim 15, wherein the $L_{conf}$ is expressed as the following Equation 9:

$$L_{conf} = -\frac{1}{M}\sum_{n=1}^{N}\sum_{k=1}^{K}(w_n^k + v_n^k)CE(\tilde{p}_n^k, p_n^k) \qquad \text{(Equation 9)}$$

where M denotes $$\sum_{n=1}^{N} \sum_{k=1}^{K} w_n^k, \tilde{p}_n^k$$

denotes a soft estimation obtained from the n-th blurry image, and $CE(\bullet, \bullet)$ denotes a cross-entropy loss function.

17. The system according to claim 14, wherein the $L_{reg}$ is expressed as the following Equation 10:

$$L_{reg} = \frac{1}{M}\sum_{n=1}^{N}\sum_{k=1}^{K} w_n^k \left\| \tilde{b}_n^k - b_n^k \right\|_1 \qquad \text{(Equation 10)}$$

where M denotes $$\sum_{n=1}^{N}\sum_{k=1}^{K} w_n^k, b_n^k$$

denotes an object bounding box measured in the n-th sharp image, $$\tilde{b}_n^k$$

denotes an object bounding box measured in the n-th blurry image, and $\|\cdot\|_1$ denotes "1-norm".

18. A system, comprising:
a teacher network including a first base subnet, a first feature pyramid subnet and a first detection subnet; and
a student network including a second base subnet, a second feature pyramid subnet, a deblurring subnet and a second detection subnet,
wherein the teacher network provides hints to the student network, and
wherein a total loss function of the system is expressed as Equation 5:

$$L_{total} = L_{det} + \lambda_1 L_{SG} + \lambda_2 L_{deblur} \qquad \text{(Equation 5)}$$

where $L_{total}$ denotes the total loss function, $L_{det}$ denotes a loss function of the first detection subnet and the second detection subnet, $L_{SG}$ denotes a parameter which controls smoothness of probability distribution, $L_{deblur}$ denote a loss function of the deblurring subnet, and each of $\lambda_1$ and $\lambda_2$ is 0.5.

19. The system according to claim 18, wherein the $L_{deblur}$ performs a process expressed as the following Equation 6:

$$L_{deblur} = \sum_{n=1}^{N}\sum_{l=1}^{L} \left\| \tilde{f}_n^l - f_n^l \right\|_1 \qquad \text{(Equation 6)}$$

where M denotes $$\sum_{n=1}^{N}\sum_{k=1}^{K} w_n^k, f_n^l$$

denotes an object bounding box measured in the n-th sharp image, $$\tilde{f}_n^l$$

denotes an object bounding box measured in the n-th blurry image, and $\|\cdot\|_1$ denotes "1-norm".

20. The system according to claim 18, wherein the $L_{SG}$ is expressed as the following Equation 7:

$$L_{SG} = L_{conf} + L_{reg} \qquad \text{(Equation 7)}$$

where $L_{SG}$ denotes a total loss function of self-guided learning, $L_{conf}$ denotes an objective function for transferring classification knowledge from sharp features to blurry features, and $L_{reg}$ denotes a regression loss function of self-guided learning.

* * * * *